(12) United States Patent
Hall

(10) Patent No.: US 9,083,027 B2
(45) Date of Patent: Jul. 14, 2015

(54) POINT CONTACT THERMAL ISOLATION

(75) Inventor: David R. Hall, Provo, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1122 days.

(21) Appl. No.: 13/043,755

(22) Filed: Mar. 9, 2011

(65) Prior Publication Data

US 2012/0231311 A1 Sep. 13, 2012

(51) Int. Cl.
*H01M 2/10* (2006.01)
*H01M 10/39* (2006.01)

(52) U.S. Cl.
CPC .......... *H01M 2/1016* (2013.01); *H01M 2/1094* (2013.01); *H01M 10/39* (2013.01)

(58) Field of Classification Search
CPC .......................... H01M 2/1016; H01M 2/1094
USPC ..................................... 429/96–100
See application file for complete search history.

(56) References Cited

U.S. PATENT DOCUMENTS

| 2,385,127 A | 9/1945 | Carlile |
| 4,332,866 A | 6/1982 | Jacquelin |
| 4,443,524 A | 4/1984 | Meinhold |
| 4,585,712 A | 4/1986 | Wedlake |
| 4,729,933 A | 3/1988 | Oswald |
| 4,774,156 A | 9/1988 | Bones |
| 5,035,963 A | 7/1991 | Plichta |
| 5,384,212 A | 1/1995 | Heiman |
| 5,441,825 A | 8/1995 | Barlow |
| 5,449,571 A | 9/1995 | Longardner |
| 5,626,982 A | 5/1997 | Kawai |
| 5,725,966 A * | 3/1998 | Abe et al. ...................... 429/167 |
| 5,756,229 A | 5/1998 | Pyszczek |
| 6,117,583 A | 9/2000 | Nilsson |
| 6,187,469 B1 | 2/2001 | Marincic |
| 6,399,238 B1 | 6/2002 | Oweis |
| 6,899,975 B2 | 5/2005 | Watanabe |
| 7,105,249 B2 | 9/2006 | Hall |
| 7,147,965 B2 | 12/2006 | Hall |
| 7,749,643 B2 | 7/2010 | Tsai |
| 7,820,319 B2 | 10/2010 | Mehta |
| 2006/0191681 A1* | 8/2006 | Storm et al. ............. 166/250.01 |
| 2007/0003831 A1 | 1/2007 | Fripp |
| 2007/0111087 A1* | 5/2007 | Tsai .............................. 429/100 |
| 2010/0216004 A1* | 8/2010 | Yoon ............................... 429/99 |
| 2012/0121951 A1 | 5/2012 | Hall et al. |

FOREIGN PATENT DOCUMENTS

WO      WO99/31752      *  6/1999

* cited by examiner

*Primary Examiner* — Jonathan G Leong
(74) *Attorney, Agent, or Firm* — Chadwick A. Sullivan; Wesley Noah

(57) ABSTRACT

In one aspect of the present invention, a battery assembly is configured that comprises a battery housing. The battery housing encases a battery cell. At least one insulator is disposed between the housing and the battery cell. A thermal pathway is formed through a point contact in the at least one insulator between the housing and the battery cell.

17 Claims, 7 Drawing Sheets

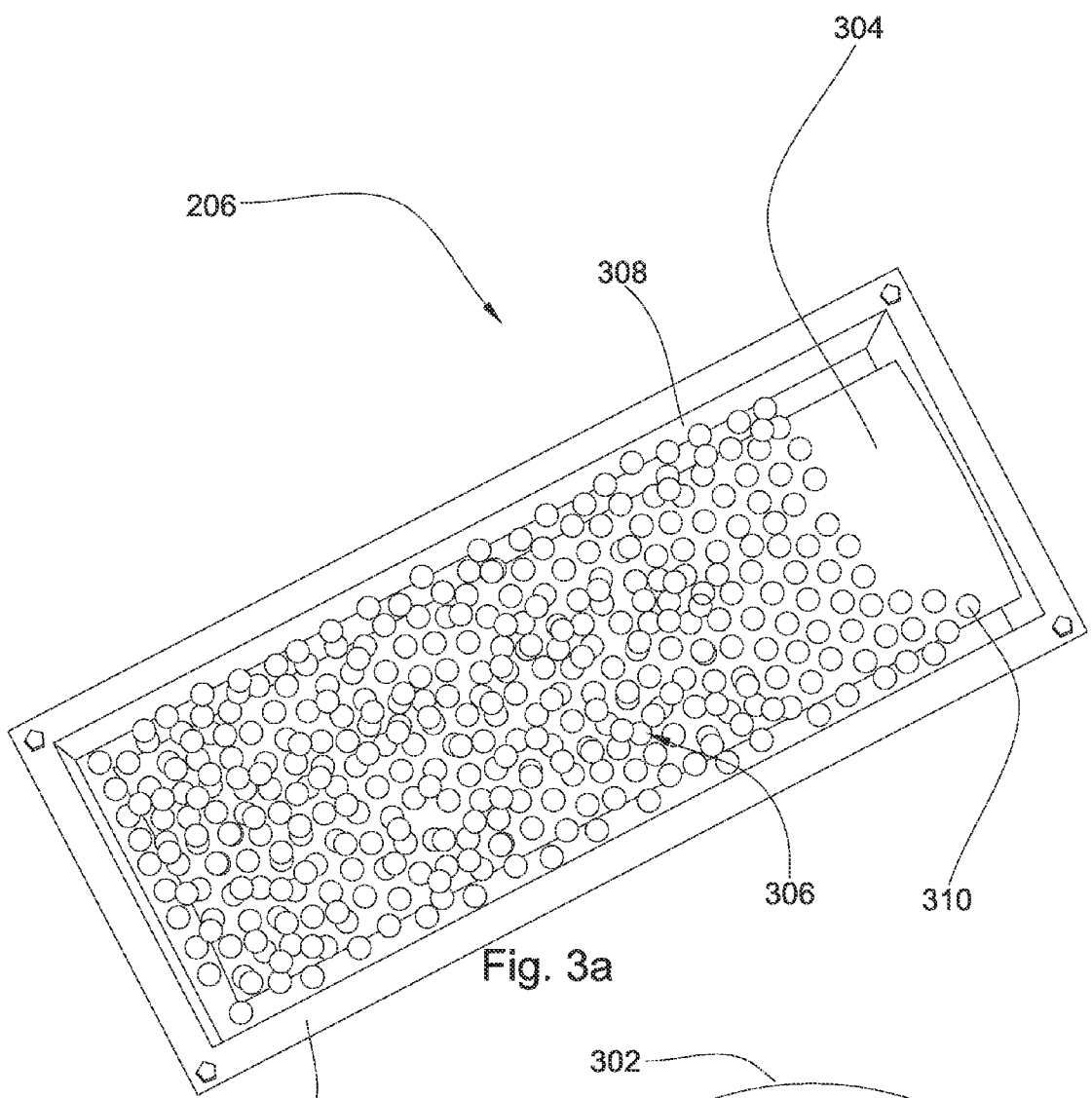
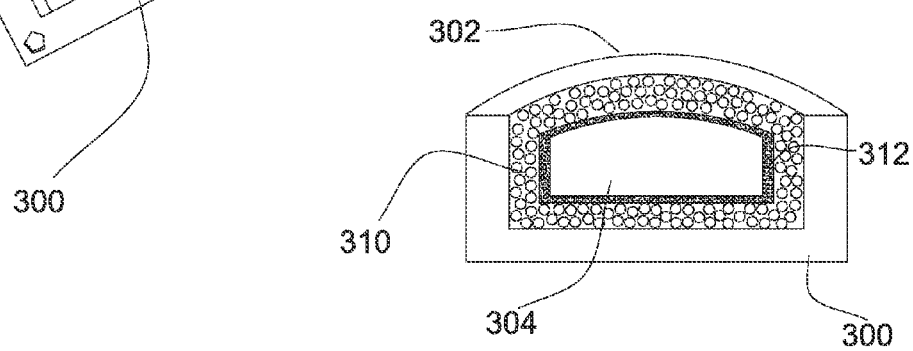

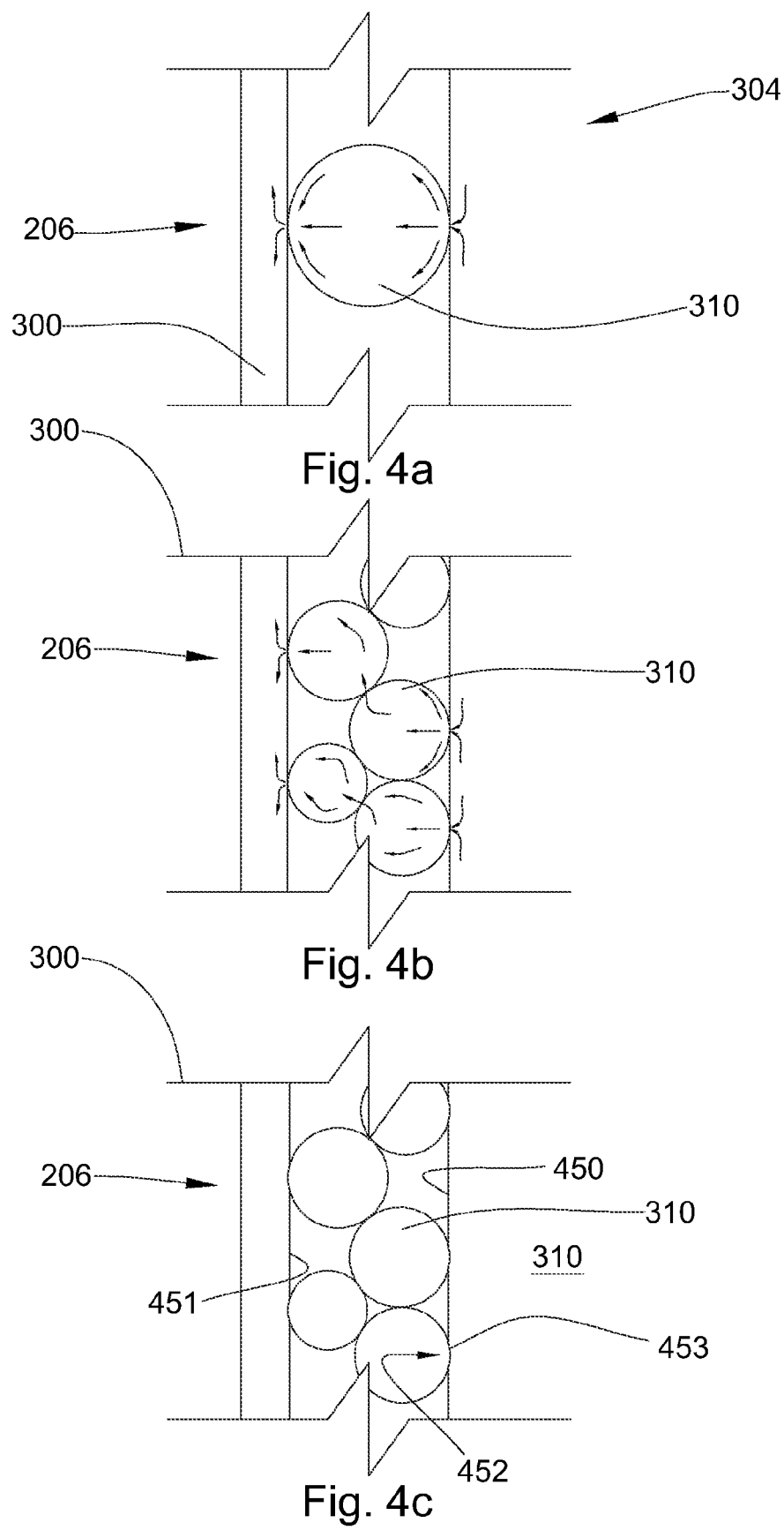

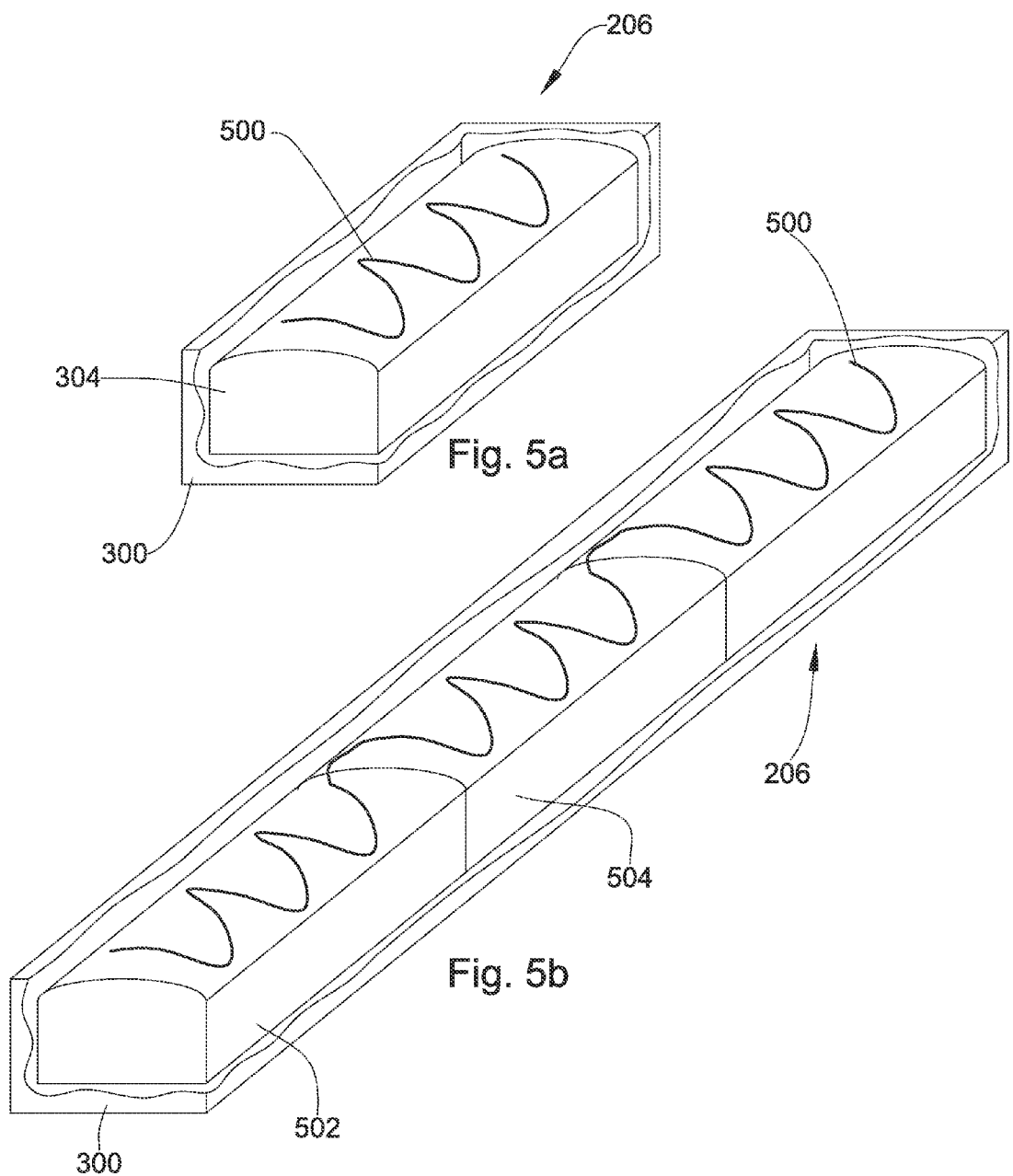

POINT CONTACT THERMAL ISOLATION

BACKGROUND OF THE INVENTION

The present invention relates generally to batteries and more specifically to batteries for use in environments with high temperatures and pressure, such as in oil and gas drilling or other downhole environments. The high temperature caused by downhole conditions may cause the battery to operate poorly.

In U.S. patent application Ser. No. 12/946,975, which is herein incorporated by reference for all that it contains, discloses a battery that is configured to operate in such high temperature downhole environments. The electrolyte comprises a salt that is non-conductive in lower temperatures. However, at high temperatures, the electrolyte turns into a molten state, allowing the battery to function.

The prior art discloses other batteries configured for use in high temperature environments. For example, U.S. Pat. No. 4,585,712 to Wedlake et al., which is herein incorporated for all that it contains, discloses a battery of interconnected high-temperature rechargeable electrochemical cells, a method of operating the battery and support means for supporting and heating the battery are provided. The support means acts to carry the cells and to heat the cells from below. Heating the cells from below is electrical and/or by circulating heated gas through a plinth on which the cells rest, the gases being derived from the catalytic conversion of a hydrocarbon fuel.

U.S. Pat. No. 4,443,524 to Meinhold et al., which is herein incorporated by reference for all that it contains, discloses a high-temperature battery with at least one electro-chemical storage cell which is surrounded by thermal insulation as well as by feed and discharge lines for the cooling air. At least one module which can be inserted into the high-temperature battery contains the storage cells. The module has a feedline for cooling air and a discharge for the cooling air which are arranged so that the cooling air can be introduced into the module against the force of gravity and discharged from the module with the force of gravity.

U.S. Pat. No. 5,449,571 to Longardner et al., which is herein incorporated by reference for all that it contains, discloses an encapsulation apparatus that is provided for a thermal management system for at least one battery. The apparatus comprises a housing including an inner wall defining a receptacle for the battery. The inner wall is positioned in thermal contact with the battery. The housing further comprises an outer wall in spaced-apart relationship with the inner wall to define an enclosure there between for receiving a phase change material.

BRIEF SUMMARY OF THE INVENTION

In one aspect of the present invention, a battery assembly comprises a battery housing, which encases a battery cell. At least one insulator is disposed between the housing and the battery cell. A thermal pathway is formed through a point contact in the at least one insulator between the housing and the battery cell.

The point contact may be formed through a variety of mechanisms. The point contact may be formed between a wall of the battery housing and a plurality of beads. The plurality of beads may prevent the housing and the cell from coming into contact with each other. The point contact may be formed between a wall of the battery housing and a plurality of narrow teeth or bristles. In some embodiments, a vacuum may remove gases within the space between the wall of the housing and the cell to minimize heat transfer.

A plurality of point contacts may rigidly secure the battery cell within the battery housing. In some embodiments, the beads are preloaded within the space between the wall of the housing and the battery cell such that the beads are held in compression. The compression may cause the beads to indent into the wall of the housing and/or the outer surface of the battery cell. These indents may provide a benefit of increasing the rigidity of the battery cell's placement within the housing. In some embodiments, the indents may be preformed in the housing's wall and/or the outer surface of the battery cell.

The beads may also comprise an additional advantage of distributing external pressure applied to the battery housing uniformly through the battery housing, and thereby, minimize stress concentrations on specific locations of the battery cell. In downhole environments, external pressures (especially in deep oil and gas and geothermal applications) on drilling equipment can exceed 25,000 ksi. Further, the tool string component that contains the battery housing may be subjected to extreme tensile, torsional, compressive, bending forces. These forces may be instantaneous or of longer duration. Regardless, a thermal insulating mechanism that also distributes external forces evenly may provide protection to the battery cell while retarding its heat loss. Also, the beads preloaded/compressed beads may absorb forces from vibrations.

The material that forms the point contact may be configured to have a low thermal conductivity. The material forming the point contact may comprise zirconium dioxide, ceramics, or other thermally insulating material. The zirconium dioxide may comprise an yttrium-stabilized ceramic topcoat and/or a calcium oxide topcoat to chemically stabilize the zirconium dioxide at high temperatures.

The components of the battery may be configured to operate at a minimum temperature of 100 degrees Celsius. The battery assembly may comprise a layer of thermal insulation surrounding the heating mechanism. In some embodiments, heat reflective material may line the battery cell and/or the wall of the housing to direct escaped heat back to the battery cell.

While the description below is directed towards downhole drilling and other subsurface applications, the present invention is useful in other applications including: mobile devices, power stations, laptops, computers, automotive applications, maritime applications, aviation applications, aerospace applications, propulsion applications, toys, appliances, power tools, and remote control devices.

Further, for the purposes of this application, the term "point contact" is considered to be contact between two independent masses that contact each other over a very small localized area. All contacts, no matter how small, will result in at least a very small surface area of a first mass that contacts at least a very small surface area of a second mass. When pressure is applied through a point contact, point loading occurs, where stress and/or strain are localized or highly concentrated within the region of the point contact. However, when pressure is applied, stress and/or strain from point loading may exist outside of the point contact area. Further, point contact may include a small amount of surface contact caused by indentation resulting from point loading or a preformed indentation that corresponds to an indentation that would reasonably result from point loading.

BRIEF DESCRIPTION OF THE DRAWINGS

FIG. 3a is cutaway view of an embodiment of a battery assembly.

FIG. 3b is a cross-sectional view of an embodiment of a battery assembly.

FIG. 4a is a cross-sectional view of an embodiment of a plurality of thermal paths in a battery assembly.

FIG. 4b is a cross-sectional view of another embodiment of a plurality of thermal paths in a battery assembly.

FIG. 4c is a cross-sectional view of another embodiment of a plurality of thermal paths in a battery assembly.

FIG. 5a is a cutaway view of an embodiment of a heating mechanism in a battery assembly.

FIG. 5b is a cutaway view of another embodiment of a heating mechanism in a battery assembly.

DETAILED DESCRIPTION OF THE INVENTION AND THE PREFERRED EMBODIMENT

Figure 1:
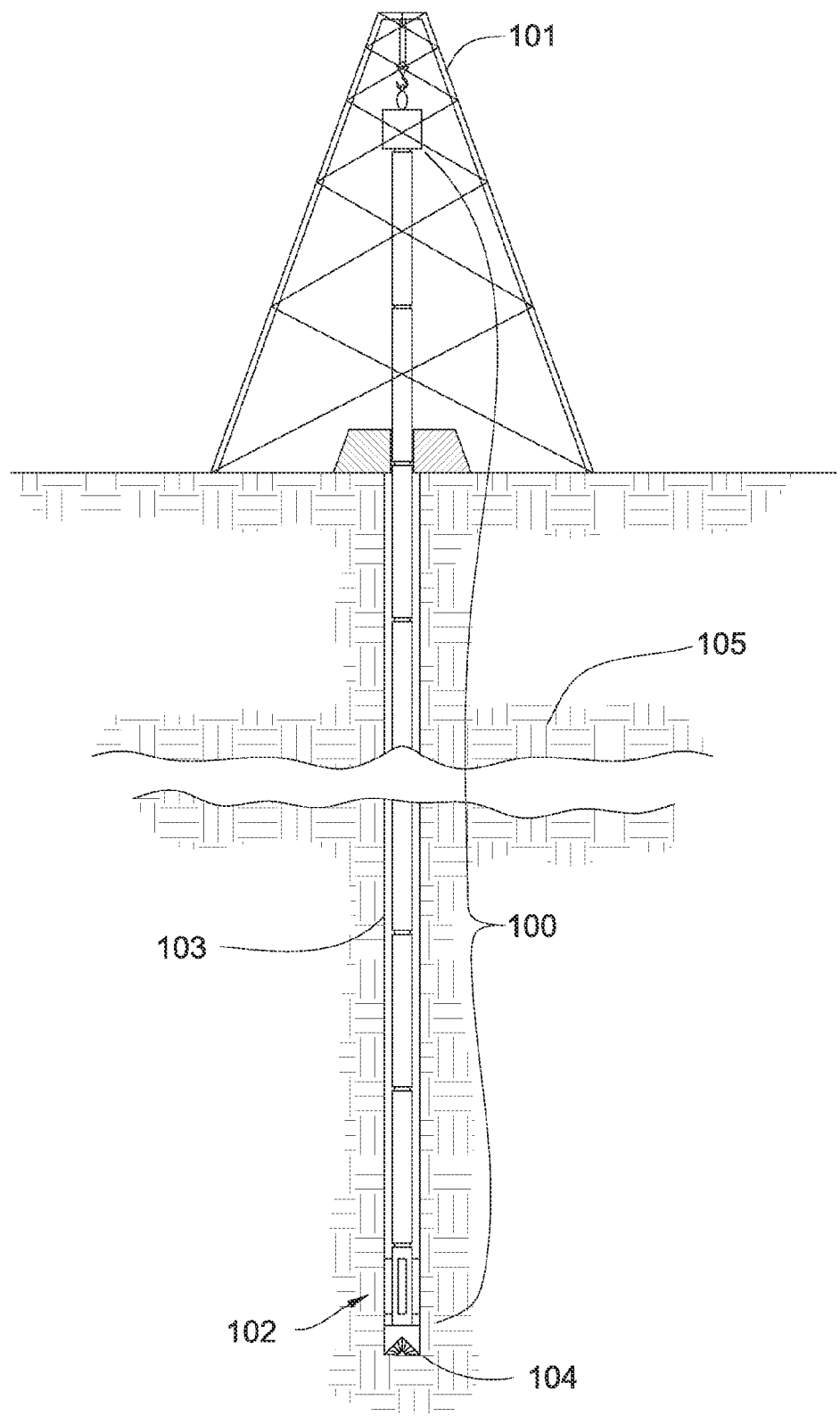
FIG. 1 is a cutaway view of an embodiment of a downhole drill string suspended from a drill rig.

Referring now to the figures, FIG. 1 is a cutaway view of an embodiment of a downhole drill string 100 suspended from a drill rig 101. A downhole assembly 102 may be located at some point along the drill string 100 and a drill bit 104 may be located at the end of the drill string 100. As the drill bit 104 rotates downhole the drill string 100 may advance farther into soft or hard earthen formations 105. The downhole assembly 102 and/or downhole components may comprise data acquisition devices which may gather data. Further surface equipment may send data and/or power to downhole tools and/or the downhole assembly 102.

Figure 2:
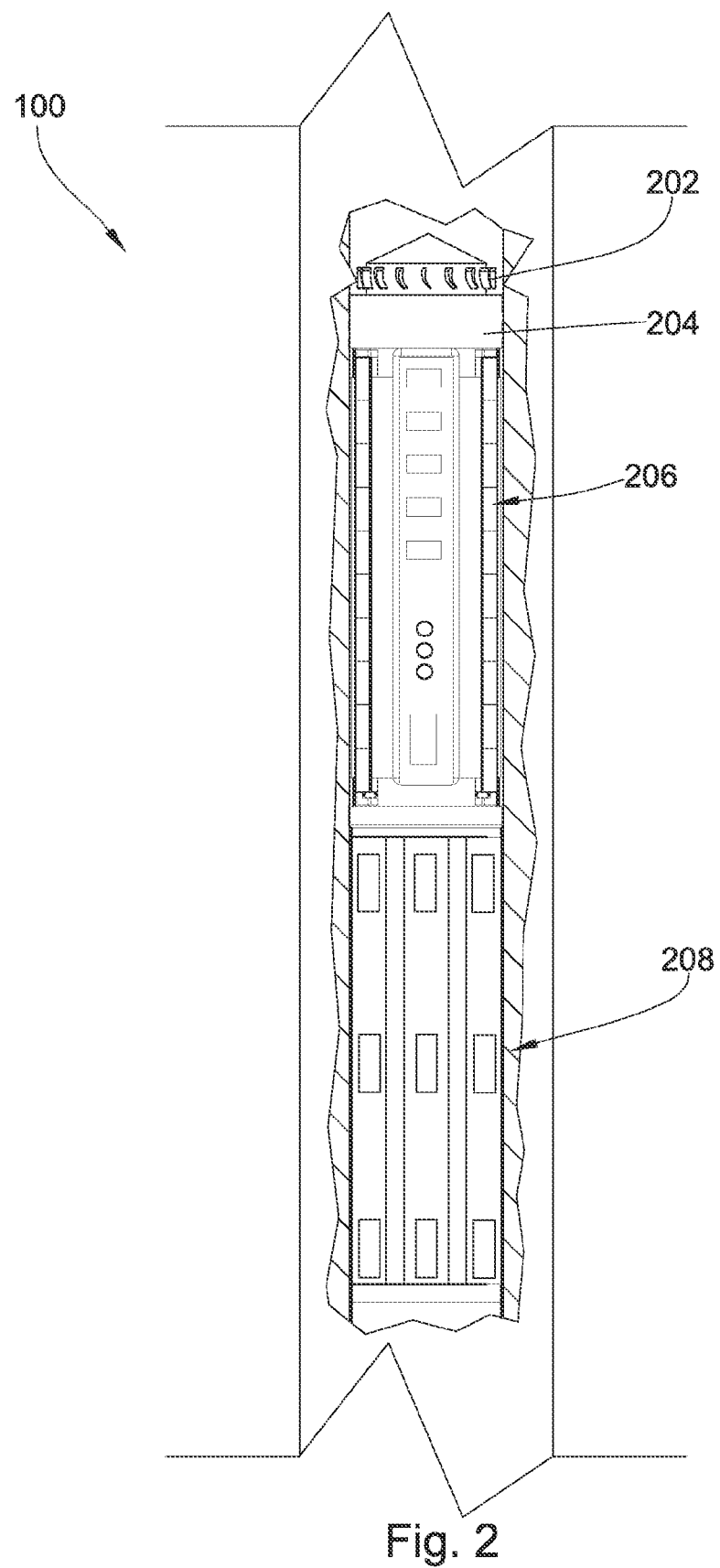
FIG. 2 is a cutaway view of an embodiment of a drill string comprising a battery assembly.

FIG. 2 is a cutaway view of an embodiment of a drill string 100 comprising a turbine 202 and generator 204 in electrical connection to a battery assembly 206 and a tool module 208. The battery assembly 206 may be disposed adjacent the tool module 208 and the turbine 202 and generator 204 may be disposed adjacent the battery assembly 206.

The tool module 208 may comprise a plurality of sensors and receivers to expedite the drilling process. The sensors and receivers may comprise resistivity transmitters, resistivity receivers, nuclear sources, scintillators, geophones, seismic/sonic sources, accelerometers, gamma ray/neutron detectors, calipers or other receiving/transmitting devices. The tool module 208 may receive power provided from the battery assembly 206 when desired.

The battery assembly 206 may form a fluid seal with the inner diameter of the drill string 100. The generator 204 may be driven by the turbine 202. As drilling fluid passes over the turbine blades, the turbine may rotate the generator 204 creating a source of power to charge or recharge the battery assembly 206. The fluid may continue through internal passages of the battery assembly 206 and tool module 208 and continue to flow through the tool string.

FIG. 3a is a cutaway view of an embodiment of a battery assembly 206. The battery assembly 206 may comprise a housing 300, a housing lid 302, a battery cell 304, and a thermal insulator 306. The battery may be intended for use in high temperature environments. In some embodiments, a minimum of 100 degrees Celsius must be reached before the battery may operate properly. In other embodiments, the temperature must reach at least 155 degrees Celsius. Often, the drilling environment will reach these extreme temperatures during the formation of the well bore. However, it may be desirable to use the batteries before the ambient, downhole temperatures are hot enough to allow the batteries to work. Further, in some applications, it may be desirable to operate the batteries as the drill string is tripped out of the well bore, which may require operating the batteries in sections of the well bore that are not hot enough to cause the battery to operate on its own.

Thus, a heating mechanism, which will be discussed later in connection with FIGS. 5a and 5b, may provide the additional heat needed for the battery's operation. However, the drill string is typically made of steel, which is a large heat sink. Thus, the additional heat applied to the battery cell, if hotter than the ambient downhole temperature, may flow through the battery housing and into the drill string.

The present invention comprises a heat insulation system that prevents heat loss from a heated battery cell 304 to a cooler downhole environment. Thermal insulators may be incorporated into the battery assembly between the cell 304 and the housing 206. Air is generally the best thermal insulator, but air will not prevent the battery cell from contacting the housing. Such contact may provide a heat leak into the housing.

An inside surface of the battery housing 300 may comprise a thermally reflective material 308. The material 308 may be utilized to aid in the prevention of heat transfer from occurring between the battery housing 300 and the surrounding environment. The battery 206 may be configured to operate at high temperatures while isolating the heat within the battery housing 300. The thermally reflective material 308 may aid in the heat isolation.

The thermal insulator 306 may be composed of a low thermally conductive material. The material may be configured from zirconium dioxide ($ZrO_2$) which has a particularly low thermal conductivity and is capable of allowing oxygen ions to freely move through the crystal structure at high temperatures. Zirconium dioxide has a monoclinic crystal structure at room temperature but may restructure into a tetragonal or cubic structure as the temperature increases. The altered structure may result in a volume expansion occurrence which often leads to large stresses in the material. The stresses often cause crack formation during cooling. This cracking may be prevented with the introduction of different oxides to stabilize the material during the tetragonal and/or cubic phases. Preferably, yttrium oxide ($Y_2O_3$) may be used to stabilize the zirconium dioxide but calcium oxide (CaO) or various other oxides may also be used.

Preferably, the zirconium dioxide may be formed into a round bead shape 310. The round bead 310 may result in reducing surface contact to single points between various surfaces within the battery housing 300. By decreasing the surface contact to a point, less heat may be conducted away from the battery housing 300, thus trapping the heat to remain within the battery assembly 206. The trapping of the heat may serve to insulate the battery cell 304 and allow the interior of the battery assembly 206 to remain at a higher temperature for a greater period of time.

The extreme vibrations that may result from the surrounding environment may be detrimental to the battery assembly 206. Thus, the beads 310 are preferably held in compression within the space between the battery housing 300 and the battery cell 304. The compression may form indentations in either the inner wall of the battery housing 300 or the outer surface of the battery cell 304. The indentations may reduce movement of the beads 310 within the space. In some embodiments, at least one of the indentations may be performed in either of the aforementioned surfaces. Preferably, the indentations are just large enough to stabilize the beads, however, larger indentations that cause greater surface area contact between the beads and either surface are contemplated.

In some embodiments, the battery cell 304, the battery housing 300 and its components may be preassembled within a vacuum. This may prevent the zirconium dioxide beads 310 from moving or translating during the vibrations of the battery cell 304 by packing them into place within the housing 300 of the battery assembly 206. The preassembled components may also serve to stabilize the battery cell 304 into place so that it doesn't shift out of position during operation.

An additional thermal covering 312 may be disposed within the battery assembly 206. The thermal covering 312 may surround the outer surface of the battery cell 304 or inner surface of the battery housing. The additional covering 312 may result in increased insulation capabilities of the battery assembly.

FIG. 4a and FIG. 4b disclose heat transfer paths that may occur within the battery assembly 206. FIG. 4a discloses a path of heat transfer that may follow the course of the arrows from the battery cell 304, to a zirconium dioxide bead 310, to a wall of the battery housing 300. The heat may only be permitted to transfer from the battery cell 304 to the zirconium dioxide bead 310 through a single point of contact. The heat may then be absorbed by the bead 310, transferred to the wall of the battery housing 300 and away from the battery assembly 206.

FIG. 4b discloses a heat transfer process with additional beads 310 involved. In this case, the heat may transfer through multiple zirconium dioxide beads 310 before reaching the outer wall of the battery housing 300. As a result, more objects may be in position for the heat to pass through. The rate and amount of heat being transferred may decrease as a result of the increased number of objects through which the heat must pass through.

Each bead disclosed in FIGS. 4a and 4b comprise independent masses that are separate from battery cell and the housing wall. Therefore, the point contacts not only force all of the heat through very small contact areas, but the point contacts also comprise thermal transfer boundaries. These thermal transfer boundaries are formed due to the independent masses. Preferably, the thermal pathway is obstructed by at least one, but preferably more, thermal transfer boundaries making heat transfer less efficient.

FIG. 4c discloses a thermal pathway that comprises a point contact formed between a bead 310 and either the outer surface 450 of the battery cell 304 or the inner surface 451 of the battery housing 300. The bead 310 is forced into the space between the housing 300 and the cell 304 and is thereby compressed between the housing 300 and cell 304. The compressive force may cause an indentation 453 into either the housing wall 300 or the battery cell 304. The indentation may increase the surface area 452 of the point contact while still obstructing efficient heat transfer.

FIG. 5a and FIG. 5b both disclose a battery assembly 206 and a heating mechanism 500 disposed within the assembly 206. The battery 206 may be configured to function once a minimum temperature of 100 degrees Celsius is attained. In other embodiments, the operating temperature may be at least 155 degrees Celsius. However, the present invention may be applied to cool weather applications, such as those found in the arctic. In these cases and other applications, the battery assembly's operating temperature may be below freezing.

The heating mechanism may be used in situations where it is desirable to operate the battery assembly 206, but the ambient temperature is too cool for the battery assembly 206 to operate efficiently. Thus, the heating mechanism 500 may bring the battery 206 to operating temperatures and the thermal pathway may prevent the heat from escaping from the battery cell 304 to minimize the amount of energy required to keep the battery cell 304 at an operating temperature.

A thermal sensor may be disposed within the battery assembly 206 to monitor the temperatures to ensure the battery cell is in an appropriate heat range. The thermal sensor may be configured to measure the temperature of various components within the battery assembly 206 and then transfer that information to a processing element. The data may be sent to the main control frame which may also be in connection with the heating mechanism 500. The control frame may power the heating mechanism 500 by switching an electrical load off and on as needed. In some embodiments, the heating mechanism 500 may be configured to provide multiple thermal outputs, enabling the heating mechanism 500 to only contribute effective and/or necessary energy into the battery 206.

The heating mechanism 500 may comprise a resistant material with a high melting point encased within an electrically insulating coating. An insulated wire may extend from the heating mechanism 500 into the cathode housing. The electrically insulating coating may make the heating mechanism 500 more energy efficient by suppressing the rate of heat transfer and isolating the heat within the desired area.

In some embodiments, an electrical source for the heating mechanism 500 is the battery 304, another battery, a generator, a thermoelectric device, photovoltaic source, combustion source, or some other external power source. Preferably, the heating mechanism 500 may be powered from a source other than the battery cell 304. Valuable energy from the battery cells 304 may be conserved if the heating mechanism 500 is powered by an outside source. However, once the battery is on, a small amount of the battery assembly's power may be used to maintain the battery assembly's operation temperature.

The present invention may also reduce damage due to extreme thermal changes when the heat source is no longer provided, and the ambient temperature is significantly below the operating temperature. If cooled too quickly, the battery assembly's components may crack due to rapid thermal shrinkage. The present invention provides the benefit of slowing the battery assembly's 206 cooling rate.

In some embodiments, the heating mechanism 500 may be flat, straight, spiral, or combinations thereof. In some embodiments, the heating mechanism 500 comprises flexibility to accommodate thermal expansion changes. In some embodiments, the heating mechanism 500 is a resistive heater.

FIG. 5b discloses the battery assembly 206 with the heating mechanism 500. A plurality of battery cells 502, 504 are disposed in series within the battery housing 300. In some embodiments, the battery cells may be connected in parallel. Multiple cells 502, 504 in one housing 300 may efficiently heat multiple battery cells 502, 504 with a single heating mechanism 500.

Figure 6:
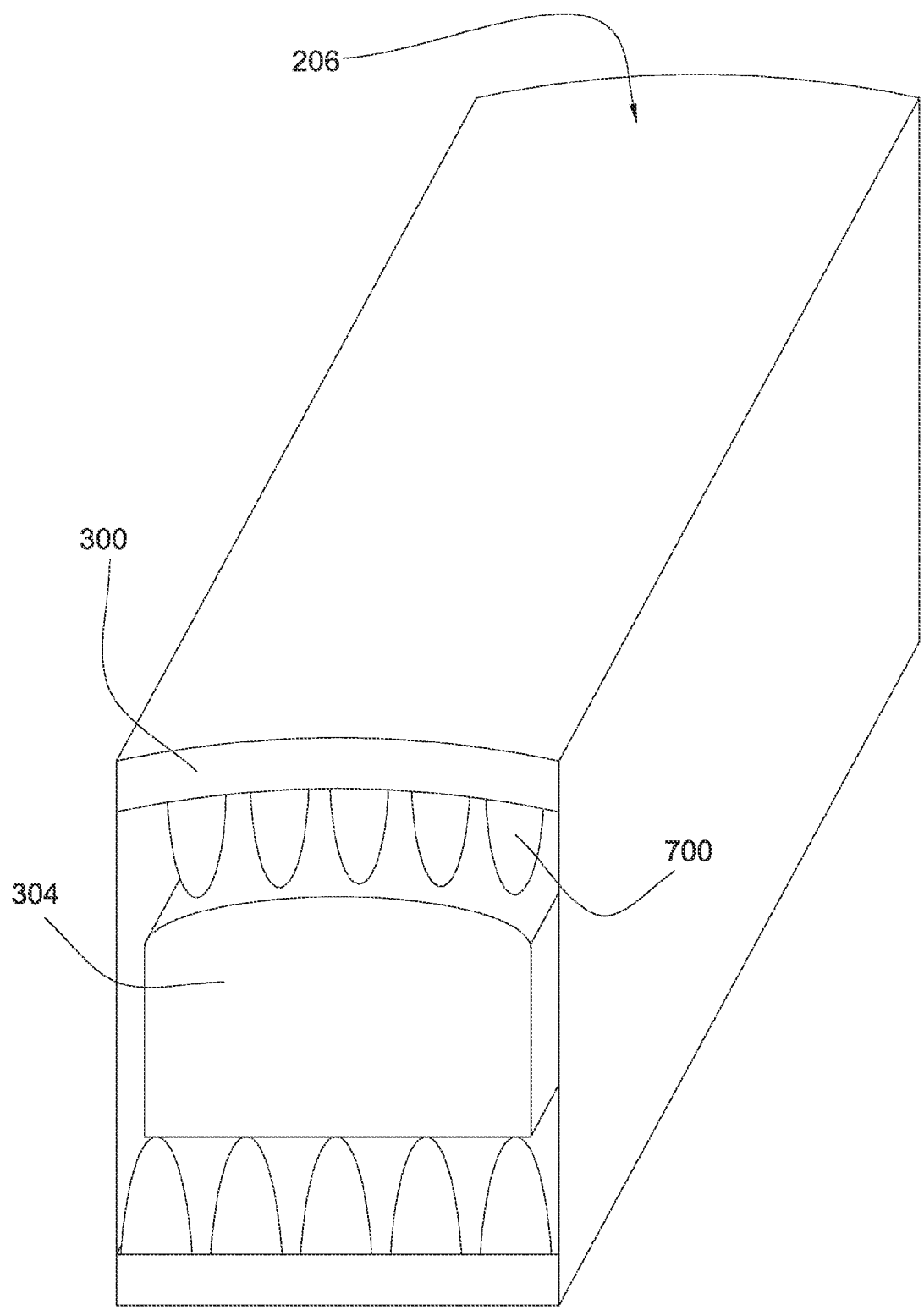
FIG. 6 is a cutaway view of an embodiment of a battery assembly.

FIG. 6 discloses an insulator with a set of narrow teeth 700. The teeth 700 may be configured to reduce contact between the battery housing 300 and battery cell 304. Preferably, each individual tooth 700 tapers to a point towards the battery cell 304. The surface contact may be limited to a point to minimize the amount of surface contact between the battery cell 304 and the rest of the battery assembly 206.

Figure 7:
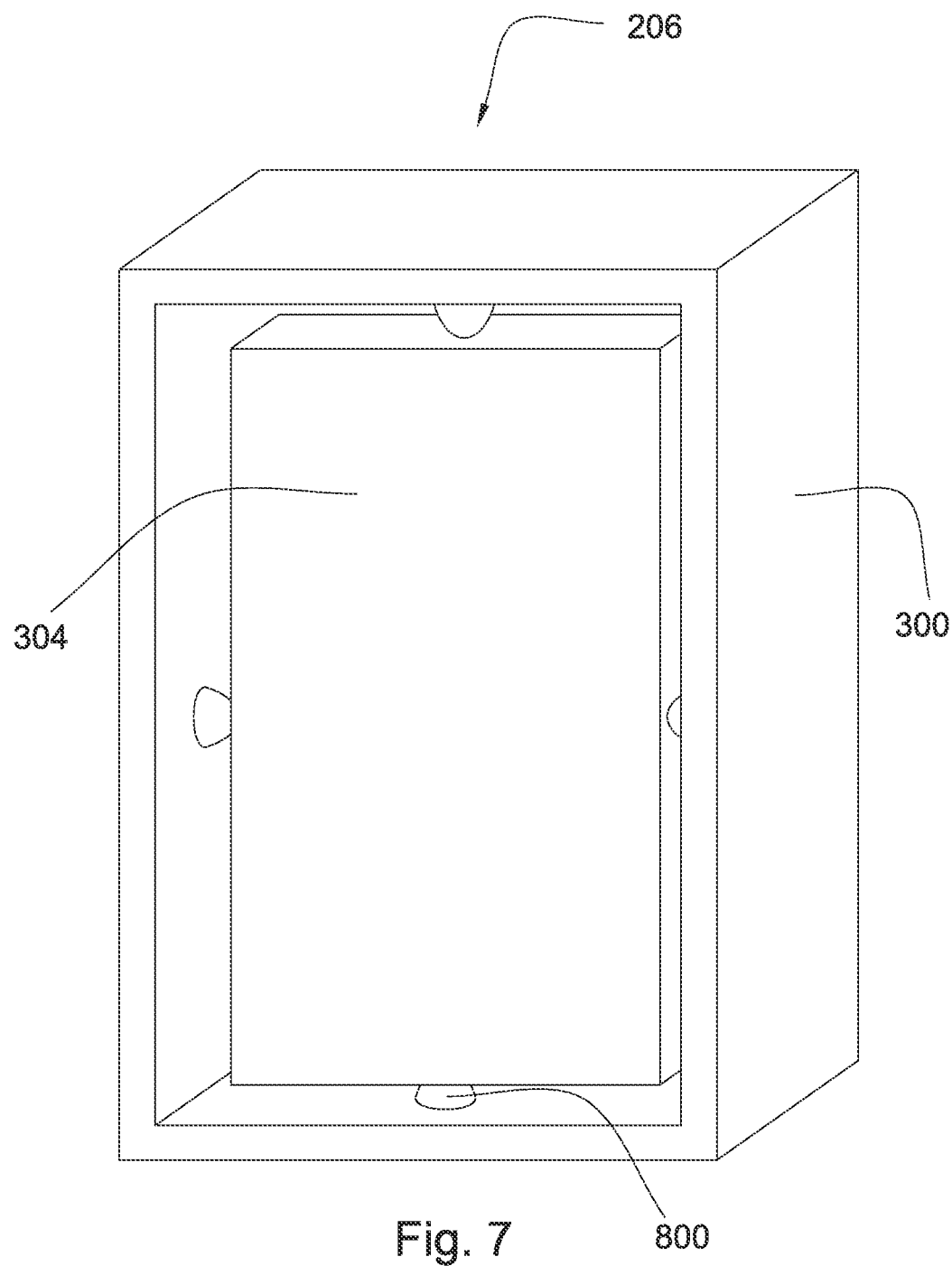
FIG. 7 is a cutaway view of an embodiment of a battery assembly.

FIG. 7 discloses the battery cell 304 secured within the battery housing 300 through a plurality of centralizers 800. The embodiment of FIG. 7 discloses four centralizers 800 contacting four faces of the battery cell 304. However, the housing wall is obstructed from view and the housing wall that is removed for illustrative purposes may also incorporate a centralizer 800. Thus, each face of the battery cell 304 may be supported by at least one centralizer 800.

In other embodiments, the battery assembly may be disposed in various high temperature environments other than downhole. The battery assembly may be configured for use within a rocket. Rockets generally function at relatively high temperatures. This may be the result of the rocket itself, as a product of propulsion, or it may also stem from the result of wind friction as the rocket is travelling at high speeds through the air.

The battery assembly may also be configured for use in gas-electric hybrids or gas automobiles. The assembly may not need any form of protection from the heat of the engine allowing for more diverse construction of automobiles.

Whereas the present invention has been described in particular relation to the figures attached hereto, it should be understood that other and further modifications apart from those shown or suggested herein, may be made with the scope and spirit of the present invention.

What is claimed is:

1. A battery assembly comprising:
    a housing that encases a battery,
    at least one thermal insulator disposed between the housing and the battery, the material that forms the thermal insulator comprising zirconium dioxide, and the zirconium dioxide comprising an yttrium-stabilized zirconium dioxide ceramic topcoat to chemically stabilize the zirconium dioxide at high temperatures; and
    a thermal pathway is formed through a point contact in the at least one insulator between the housing and the battery cell.

2. The battery assembly of claim 1, wherein the point contact is formed between a wall of the battery housing and a plurality of beads.

3. The battery assembly of claim 2, wherein the plurality of beads are preloaded into the assembly in a vacuum to secure the beads into place within the battery housing.

4. The battery assembly of claim 2, wherein the beads are preloaded such that the beads are in compression.

5. The battery assembly of claim 4, wherein the beads form an indent in at least the inner surface of the housing or an outer surface of the battery cell.

6. The battery assembly of claim 1, wherein a plurality of point contacts secures the battery cell into place within the battery housing.

7. The battery assembly of claim 1, wherein the battery is configured to begin operation at a minimum temperature of 100 degrees Celsius.

8. The battery assembly of claim 1, wherein a heating mechanism disposed within the housing is configured to heat the battery cell.

9. The battery assembly of claim 8, wherein the battery comprises a thermal coating to surround the heating mechanism.

10. The battery assembly of claim 8, wherein the heating mechanism is powered by an external source.

11. The battery assembly of claim 1, wherein the battery housing encases a plurality of battery cells.

12. The battery assembly of claim 1, wherein an electrical insulator is disposed between the anode housing of a first and a second battery cell.

13. The battery assembly of claim 1, wherein the battery comprises an internal thermal sensor.

14. The battery assembly of claim 1, wherein the battery comprises an electrical connection to a downhole generator.

15. The battery assembly of claim 1, wherein an inside surface of the battery housing comprises a thermally reflective material.

16. The battery assembly of claim 1, wherein the assembly comprises an additional thermal covering surrounding the battery cell.

17. The battery assembly of claim 1, wherein the assembly is incorporated in a downhole drill string component.

* * * * *